(12) United States Patent
Yamaguchi

(10) Patent No.: US 7,035,437 B2
(45) Date of Patent: Apr. 25, 2006

(54) IMAGE READING APPARATUS

(75) Inventor: Hiroshi Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 614 days.

(21) Appl. No.: 10/156,769

(22) Filed: May 29, 2002

(65) Prior Publication Data
US 2002/0181759 A1 Dec. 5, 2002

(30) Foreign Application Priority Data
May 29, 2001 (JP) ............................ 2001-160238

(51) Int. Cl.
*G06K 9/00* (2006.01)
(52) U.S. Cl. ................. 382/112; 250/559.02; 356/404; 356/443
(58) Field of Classification Search ................ 382/112; 250/559.01–559.49; 356/237.1–237.6, 402, 356/404, 429–430, 432–444
See application file for complete search history.

(56) References Cited

U.S. PATENT DOCUMENTS

| 5,266,805 A | * | 11/1993 | Edgar ........................... 250/330 |
| 5,509,086 A | * | 4/1996 | Edgar et al. ................. 382/167 |
| 6,075,590 A | | 6/2000 | Edgar |
| 6,442,301 B1 | * | 8/2002 | Edgar .......................... 382/275 |

FOREIGN PATENT DOCUMENTS

| EP | 0 660 591 A2 | 6/1995 |
| JP | 6-28468 | 2/1994 |
| JP | 11-75039 | 3/1999 |
| WO | WO 98/31142 A1 | 7/1998 |

* cited by examiner

*Primary Examiner*—Kanjibhai Patel
*Assistant Examiner*—Aaron Carter
(74) *Attorney, Agent, or Firm*—Sughrue Mion, PLLC

(57) ABSTRACT

The image reading apparatus for photoelectrically reading an original image includes an image reading device and a detection device. The image reading device has first reading unit for reading a visible image carried by the original image and a second reading unit for reading a reference image in a wavelength different from that used to read the visible image. The detection device acquires correlative pixel distribution information between a visible image signal and a reference image signal using the visible image and the reference image having been read by the image reading device and detects an image defect caused by a foreign particle deposited on the original image and a flaw of an original using the information. The apparatus can detect the image defect of the film with pinpoint accuracy without erroneous detection without depending upon a type of the film and a state of the image, and output in excellent productivity an image of high quality whose image defect has been preferably corrected.

12 Claims, 4 Drawing Sheets

IMAGE READING APPARATUS

BACKGROUND OF THE INVENTION

The present invention relates to the technical filed of an image reading apparatus for photoelectrically reading an image, and the like recorded on a film, and more particularly to an image reading apparatus capable of accurately detecting an image defect caused by a foreign particle deposited on a film and by a flaw of the film.

Most of the images recorded on photographic films such as negatives and reversals (which are hereinafter referred to as "films") are conventionally printed onto light-sensitive materials (photographic papers) by a technique generally called "direct exposure" in which the image on a film is projected onto the light-sensitive material for exposure.

In contrast, recently, an image recorded on a film is read photoelectronically and is converted into digital signals, which are subjected to various kinds of image processing to produce recording image data; and a light-sensitive material is exposed with recording light modulated according to the image data, thereby the light-sensitive material is output as a print on which the image is recorded, and further the image data is also output to various recording mediums such as a CD-R and a hard disk (HD) as an image file.

According to this digital processing, since an image recorded on a film is read and subjected to image processing as digital image data, color and density can be very preferably corrected. In addition to the above, an image of high quality can be obtained by performing image processing such as gradation correction, sharpness processing (sharpness correction), and the like which is basically impossible in a printer employing ordinary direct exposure.

Incidentally, there is an image defect in an image output from a film acting as an original as a serious factor for deteriorating the quality of the image. The image defect is caused by a foreign particle such as dust, dirt, and so on deposited on the film, a flaw, scratch of the film formed by friction, and the like (hereinafter, the image defect is generally referred to as "dust/flaw").

Conventional printers employing the direct exposure output a print whose dust/flaw is corrected in such a manner that an operator manually cleans a film or corrects the image (film) with a color material. Whereas, in the digital processing in which an image recorded on a film is read photoelectrically and processed as digital image data, it is possible to detect a dust/flaw by analyzing the image data obtained by reading the image and to correct it by executing image processing.

In digital printers, there is conventional known a method of detecting a dust/flaw of a film by reading an image of the film in an invisible region of infrared light (IR light), and the like, as a method of detecting the dust/flaw of the film (refer to JP 6-28468 A, JP 11-75039A, etc.).

That is, since IR light is not absorbed by an image (dye) recorded on a film and is scattered by a dust/flaw, it is possible to detect a dust/flaw from a change of signal intensity when the film is read with the IR light.

However, there is a case in which an image is absorbed by invisible light depending upon a type of a film and a state of an image and further depending upon a wavelength of the invisible light. At this time, even a proper portion that is not a dust/flaw is determined also as a dust/flaw and erroneously detected.

Thus, when an image is corrected according to a result of detection of a dust/flaw detected by IR light, and the like, even a proper portion of the image that is not a dust/flaw may be corrected, which deteriorates image quality conversely. Further, since a proper portion that need not be intrinsically corrected is also processed, a problem arises in that processing is time-consuming and productivity (a processing efficiency) is deteriorated.

To prevent this disadvantage, invisible light must have a wavelength that does not absorb dye at all, from which a problem is also arisen in that the design of an optical system is very difficult regarding aberration, and the like, and further a cost is greatly increased.

SUMMARY OF THE INVENTION

An object of the present invention is to solve the problems of the conventional art and to provide a productive and less expensive image reading apparatus for photoelectrically reading an image, and the like recorded on a film, the image reading apparatus being arranged such that it can accurately detect an image defect caused by a foreign particle such as dust, dirt, and the like deposited on the film and by a flaw, and so on of the film without erroneously detecting it regardless of a type of the film and a state of the image, and thus it can output an image of high quality the image defect of which resulting from the above factors has been preferably corrected.

In order to attain the object described above, the present invention provides an image reading apparatus for photoelectrically reading an original image, comprising: an image reading device having a first reading unit for reading a visible image carried by the original image and a second reading unit for reading a reference image in a wavelength different from that used to read the visible image; and a detection device for acquiring correlative pixel distribution information between a visible image signal and a reference image signal using the visible image and the reference image having been read by the image reading device and detecting an image defect caused by a foreign particle deposited on the original image and a flaw of an original using the information.

Preferably, the detection device detects the image defect using the reference image signal and a threshold value as well as detects the image defect by correcting the reference image signal according to the correlative pixel distribution information or by changing the threshold value according to the correlative pixel distribution information.

Preferably, the detection device determines a proper image reference signal to the visible image signal from the correlative pixel distribution information between the visible image signal and the reference image signal and corrects the reference image signal or changes the threshold value using the proper reference image signal.

Preferably, the second reading unit reads an invisible image as the reference image.

Preferably, the second reading unit reads the reference image in correspondence to one color in the visible image read by the first reading unit as well as in a wavelength different from that used in the first reading unit.

DETAILED DESCRIPTION OF THE INVENTION

An image reading apparatus of the present invention will be described below in detail with reference to a preferable embodiment shown in the accompanying drawings.

Figure 1:
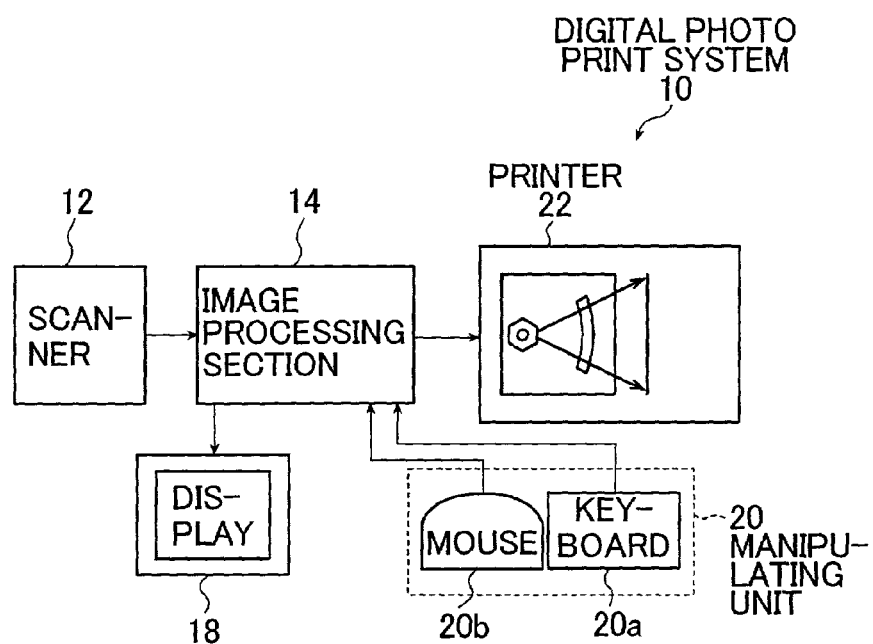
FIG. 1 is a block diagram of an embodiment of a digital photo print system making use of an image reading apparatus of the present invention.

FIG. 1 shows a block diagram of an embodiment of a digital photo print system making use of the image reading apparatus of the present invention.

The digital photo print system (hereinafter, referred to as "print system") 10 shown in FIG. 1 reads an image recorded on a film F photoelectrically and outputs the image as a print (photograph) and is basically composed of a scanner 12, an image processing section 14, a display 18, a manipulating unit 20 (a keyboard 20a and a mouse 20b), and a printer 22.

Figure 2:
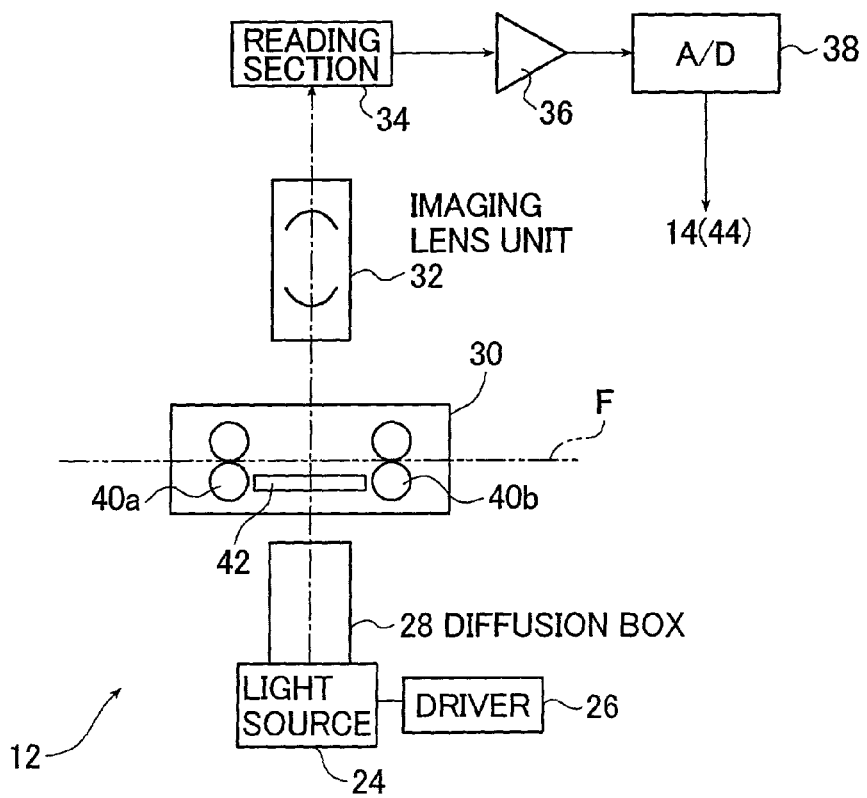
FIG. 2 is a conceptual view of an embodiment of a scanner of the digital photo print system shown in FIG. 1.

The scanner 12 is a device for photoelectrically reading the image recorded on each frame of the film F. As shown in the conceptual view of FIG. 2, the scanner 12 is composed of a light source 24, a driver 26, a diffusion box 28, a carrier 30, an imaging lens unit 32, a reading section 34, an amplifier 36, and an analog/digital (A/D) converter 38.

In the scanner 12 of the illustrated embodiment, the light source 24 utilizes light emitting diodes (LEDs) and is composed of three types of LEDs for emitting R (red) light, G (green) light, and B (blue) light as visible light, and an LED for emitting infrared light (IR light) as invisible light, and these LEDs are disposed in the light source 24. The light source 24 is driven by the driver 26 and sequentially emits the visible light and the infrared light.

The diffusion box 28 makes the light, which is incident on the film F, uniform in a film surface direction, that is, uniform on any position of the film surface.

The carrier 30 intermittently transports the film F so as to transport and hold the respective images recorded on the film F (respective frames) to and at a predetermined reading position. A plurality of types of carriers 30 are prepared according to film sizes, and the like and are arranged so as to be detachably mounted on the main body of the scanner 12.

In the illustrated example, the carrier 30 has transport roller pairs 40a and 40b that are disposed across a predetermined reading position to transport the film F in a lengthwise direction and a mask 42 for regulating the reading region of each frame at the reading position.

The imaging lens unit 32 causes the light projected from the film F to form a focused image on the reading section 34 at the predetermined position thereof.

The reading section 34, which photoelectrically reads the images recorded on the film F using an area CCD sensor, reads the entire surface of one frame of the film F regulated by the mask 42 of the carrier 30 (an image is read by area exposure).

When the film F is read by the scanner 12 arranged as described above, first, the film F is transported by the carrier 30 so as to transport a frame to be read (ordinarily, first or final frame) to the reading position.

Next, the R LED, for example, of the light source 24 is driven by the driver 26 and emits R light. The R light is incident on the reading position and then incident on the frame held thereat after the quantity thereof is made uniform on the surface of the film F by the diffusion box 28, passes through the frame, and acts as projecting light that carries the image recorded on the frame. This projecting light is caused to form the focused image on the reading section 34 at the predetermined position thereof (the light receiving plane of the area CCD sensor) by the imaging lens unit 32, and the R image of the frame is read photoelectrically.

Likewise, the G and B images of the frame are read by sequentially emitting the G and B LEDs of the light source 24, and finally the invisible image of the frame is read with IR light by emitting the IR LED of the light source 24 (the IR image is read), thereby the reading of the frame is finished. Accordingly, four-channel image signals of the R (red), G (green) and B (blue) visible images and the infrared image (invisible image) are output from the scanner 12.

When the image of one frame has been read, the carrier 30 transports the film F so as to transport the image of a frame to be read next to the reading position.

The signals output from the reading section 34 are amplified by the amplifier 36, converted into digital image signals by the A/D converter 38, and supplied to the image processing section 14 (a data correcting subsection 44).

In the present invention, an image reading device is not limited to the scanner 12 of the illustrated embodiment. The images recorded on the film may be read in the four channels in the same way by using, for example, a white light source such as a halogen lamp, or the like in place of the four-color LEDs as well as by providing a filter inserting device for inserting R, G, B, and IR filters upstream of the diffusion box 28. Otherwise, the images recorded on the film may be read in the four channels in the same way by so-called slit scan using a similar white light source and a four-line CCD sensor for reading R, G, B, and IR images.

In the print system 10, the scanner 12 reads the image recorded on one frame twice. That is, the scanner 12 carries out fine scan for reading the image at a high resolution to output a print, and the like and prescan for reading the image at a low resolution prior to the fine scan to determine the reading conditions of the fine scan and the image processing conditions in the image processing section 14.

At this time, the output signals in the prescan and the output signals in the fine scan are basically the same data except that they have a different resolution and a different output level.

Figure 3:
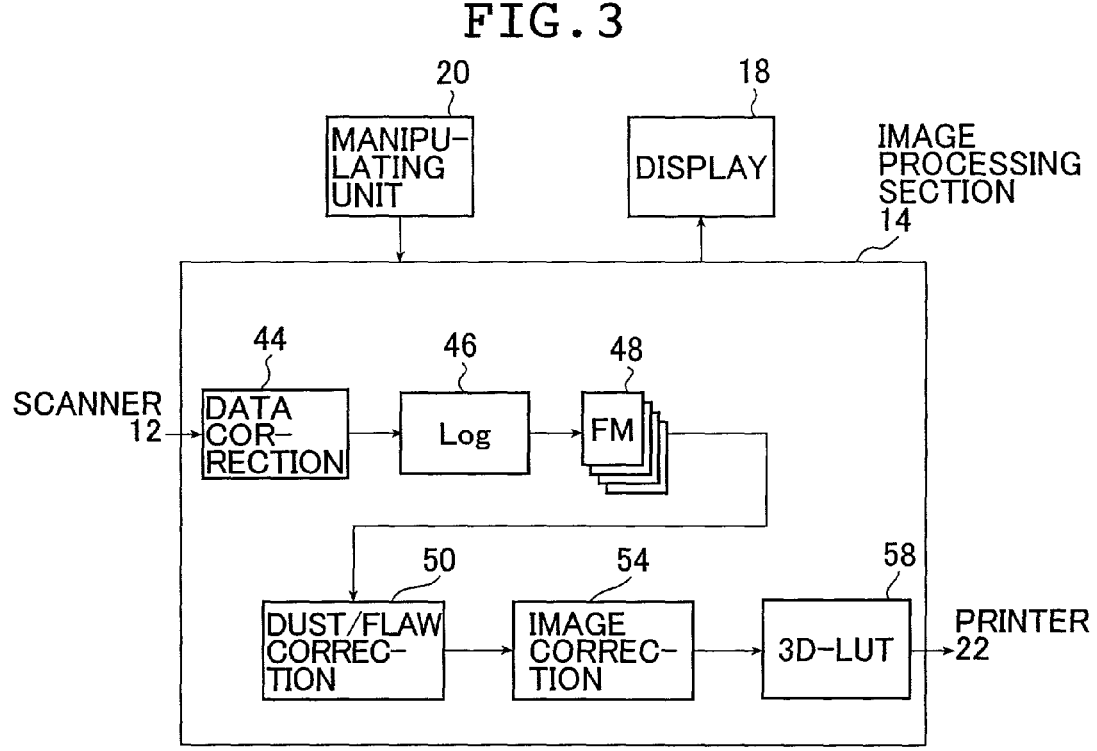
FIG. 3 is a block diagram of an embodiment of an image processing unit of the digital photo print system shown in FIG. 1.

As described above, the digital image signals output from the scanner 12 are supplied to the image processing section 14. FIG. 3 shows a block diagram of the image processing section 14.

As shown in FIG. 3, the image processing section 14 includes the data correcting subsection 44, a Log converter 46, frame memories (hereinafter, referred to as "FMs") 48, a dust/flaw correcting subsection 50, an image correcting subsection 54, and a data converting subsection (3D-LUT) 58.

While not shown, the image processing section 14 of the print system 10 is branched from the Log converter 46 at a position downstream in a data flow direction (hereinafter, referred to as "downstream") and has a processing path that is basically similar to that from the FMs 48 to the data converting subsection 58 in order to process the prescan data and to display a simulation image used in a verification on the display 18. Note that the processing path may or may not include the dust/flaw correcting subsection 50.

The data correcting subsection 44 is a section for subjecting the output data of the respective R, G, B, and IR images supplied from the scanner 12 to predetermined corrections such as DC offset correction, darkness correction, shading correction, and the like.

The Log converter 46 subjects the output data having been processed in the data correcting subsection 44 to Log conversion through, for example, a look-up table (LUT) or the like and arranges it as digital image (density) data.

The image data of the respective R, G, B, and IR images having been converted in the Log converter 46 is stored in the FMs 48 that correspond thereto.

The image data stored in the FMs 48 is processed in the dust/flaw correcting subsection 50.

The dust/flaw correcting subsection 50 is a section for detecting the image defect ("dust/flaw") caused by a foreign matter such as dust, dirt, and the like deposited on the film and a flaw, and the like of the film and for correcting the detected dust/flaw using the image data of the R, G, and B visible images and the image data of the IR image (invisible image). Note that, in the following description, the dust/flaw may be detected using the prescanned image data, if possible.

The dust/flaw correcting subsection 50 does not simply detect the dust/flaw from the intensity of the IR image data (hereinafter, referred to as "IR data") but detects the image defect from the correlation between the image densities (image signals) of both the image data of the R, G, and B visible data (hereinafter, referred to as "visible image data") and the IR data.

Conventionally, the IR image is read and the dust/flaw is detected making use of the fluctuation of the density of the IR image (IR signal intensity) to correct the dust/flaw of the film. In this method, however, the image recorded on the film may absorb IR light depending upon a state of the image and a type of the film, which results in such a disadvantage that the dust/flaw is erroneously detected by correcting the image at an unnecessary portion (proper portion), and thus image quality is deteriorated and a processing time is increased, as described above.

The inventors have examined an IR light absorbing factor by which an image defect is erroneously detected in detail. As a result, the inventors have found that a silver component remaining in an image (in a film) absorbs IR light and the image defect is erroneously detected thereby.

A so-called color silver halide photographic film is designed such that a silver component existing thereon is entirely removed basically by bleach processing and fix processing executed after color development processing. However, the silver component may remain in an image (hereinafter, this is referred to as "remaining silver") because it cannot be completely removed by the bleaching processing, and the like due to the degradation of a processing solution, film characteristics, and the like. Further, according to the examination of the inventor, in a negative film, a silver component remains more often in a high density region (high luminance region in a recorded scene) than in a low to medium density region.

The remaining silver absorbs IR light. Accordingly, when, for example, a region whose IR density (IR data) is higher than the threshold value, that is, a region where a less amount of light is received by the reading section 34, is detected as the dust/flaw making use only of the density of the IR image, a region whose IR density is high due to the remaining silver is also detected as a dust/flaw regardless of that the region is not the dust/flaw. As a result, a proper region which is not a dust/flaw is unnecessarily corrected, thereby image quality is deteriorated and a processing time is increased, as described above.

Moreover, since the amount of remaining silver is variously changed depending upon a state of a processing solution and film characteristics, it is impossible to properly deal with the amount of the remaining silver by a fixed parameter.

In contrast, the present invention can detect a dust/flaw with pinpoint accuracy by eliminating the influence of remaining silver making use of the correlative pixel distribution between R, G, B visible image densities and an IR image density.

Figure 4A:
FIGS. 4(A), (B), (C), and (D) are graphs explaining an example of image defect detection in the present invention.
Figure 4B:
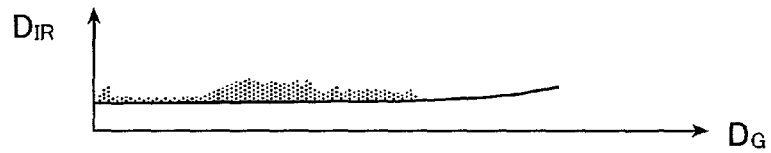
Figure 4C:

FIGS. 4(A), (B), (C), and (D) show examples of the correlations between the visible image densities (image data) and the IR image density as to the respective pixels of an image.

Note that, in FIGS. 4, (A) shows the correlation between an R density ($D_R$) and the IR density ($D_{IR}$), (B) shows the correlation between a G density ($D_G$) and the IR density ($D_{IR}$), and (C) shows the correlation between a B density ($D_B$) and the IR density ($D_{IR}$), respectively. Further, (D) shows the correlation between an image density ($D_V$) including all of the R, G, and B, and the IR density ($D_{IR}$).

Note that $D_V$ can be calculated by the following formula.

$$D_V = \alpha D_R + \beta D_G + \gamma D_B$$

Here, α, β, and γ are coefficients (preferably α+β+γ=1) and may be suitably determined according to the apparatus characteristics of a type of a film, and the like. In the negative film, however, since an R photosensitive layer is a lowermost layer and a B photosensitive layer is an uppermost layer, it is preferable to set the relationship of "γ>β>γ", in case of taking account of cleansing of the silver component resulting from a layer configuration.

As shown in FIGS. 4(A)–(D), a minimum IR density moves upward toward a higher density side in any of the visible images.

If the remaining silver and the dust/flaw did not exist at all, the IR density should have the same value, that is, $D_{IR}$ should be represented by a straight line regardless of the visible image densities. Accordingly, it is contemplated that the portion of the IR density whose minimum line moves upward corresponds to the IR density caused by the remaining silver.

When the IR density caused by the remaining silver is shown by $D_{Ag}$, the IR density caused by the dust/flaw is shown by $D_{de}$, and the IR density intrinsically provided with a film is shown by C, a measured IR density $D_{IR}$ can be shown by the following formula.

$$D_{IR} = D_{Ag} + D_{de} + C$$

That is, if the IR density $D_{Ag}$ caused by the remaining silver can be eliminated from the measured IR density $D_{IR}$, it is possible to detect an image defect due to a dust/flaw with pinpoint accuracy without influence resulting from the remaining silver.

If the remaining silver influences the IR density, the IR density and the visible image density of the same pixel (located at the same image position) must have a correlation.

Further, the dust/flaw does not exist in almost the entire area of an image (one frame) in an ordinary film F. According to the examination executed in this invention, only about 0.3% of the pixels in an image has the dust/flaw, and this ratio hardly exceeds 1%.

Accordingly, when it is assumed that a visible image is composed of a group of pixels having the same image density, a pixel without the dust/flaw must exist in the group. Then, in this group of the pixels, it is contemplated that the IR data of the pixel having the lowest IR density is the IR data of the pixel that does not have an image defect due to a dust/flaw, that is, it is the IR data that depends on only the remaining silver.

In other words, when the film F has no dust/flaw, the IR densities (proper IR densities) with respect to the visible image densities are located on the minimum lines of the IR densities $D_{IR}$ shown in FIGS. 4(A)–(D), and it is determined that the pixels located above the minimum lines are pixels having a dust/flaw.

The present invention makes it possible to detect an image defect caused by a dust/flaw with pinpoint accuracy without being influenced by remaining silver by the use of the above determination.

Figure 5:
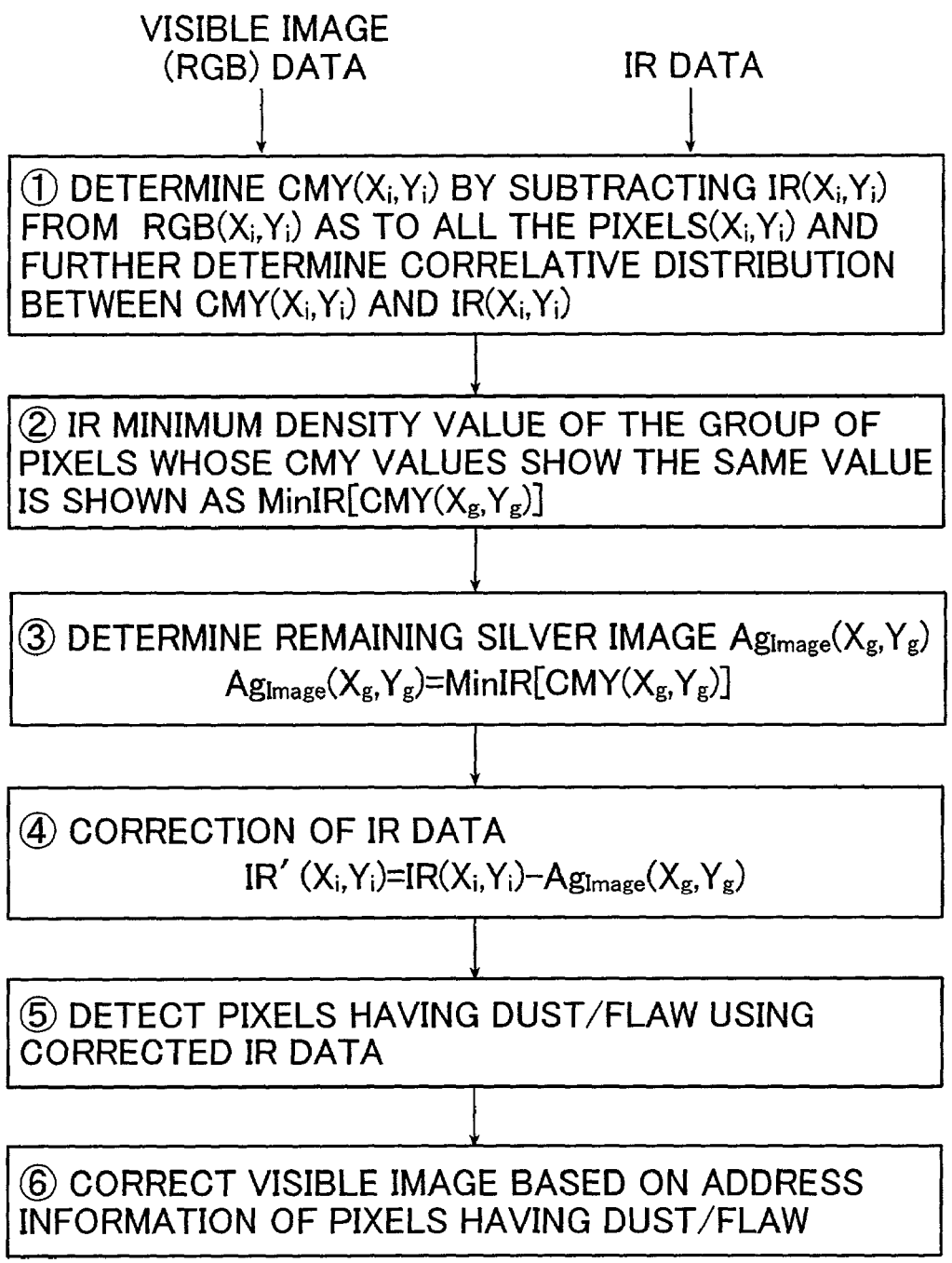
FIG. 5 is a flowchart explaining an example of the detection and correction processing of the image defect in the present invention.

Processing executed in the dust/flaw correcting subsection 50 will be specifically described below with respect to FIG. 5.

When the R, G, and B visible image data and the IR data have been stored in the FMs 48, the dust/flaw correcting subsection 50 reads out both the data. Then, first, the dust/flaw correcting subsection 50 subtracts IR $(x_i, y_i)$ that is the IR data from RGB $(x_i, y_i)$ that is the visible image data as to all the pixels $(x_i, y_i)$ and determines visible dye image data CMY$(x_i, y_i)$.

$$CMY(x_i, y_i) = RGB(x_i, y_i) - IR(x_i, y_i)$$

Note that RGB $(x_i, y_i)$ can be determined from, for example, "$D_v = \alpha D_R + \beta D_G + \gamma D_B$" described above.

Figure 4D:
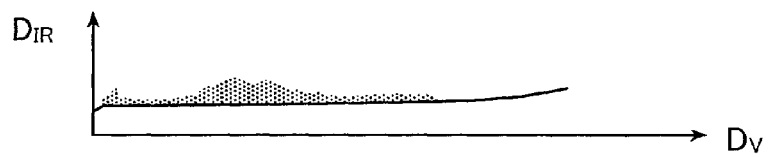

Then, the correlative distribution of pixels between the visible dye image data CMY$(x_i, y_i)$ and IR$(x_i, y_i)$ as shown in FIG. 4(D) is determined as to all the pixels $(x_i, y_i)$.

When the distribution of pixels has been determined, the dust/flaw correcting subsection 50 determines the minimum IR data in the group of the pixels having the same visible dye image data CMY $(x_i, y_i)$ and sets it as MinIR[CMY$(X_g, y_g)$] in a pixel group g.

Further, when MinIR[CMY$(X_g, y_g)$] has been determined, it is set as remaining silver image $Ag_{Image}(X_g, y_g)$. That is, when FIG. 4(D) is referred, the lowest line of the IR density $D_{IR}$ corresponds to the remaining silver image $Ag_{Image}(X_g, y_g)$ with respect to FIG. 4(D).

$$Ag_{Image}(X_g, y_g) = MinIR[CMY(X_g, y_g)]$$

Note that the remaining silver image $Ag_{Image}(X_g, y_g)$ may be stored in a table prepared for each pixel group g or may be represented by a function such as F[CMY$(X_g, y_g)$] in correspondence to all the pixel groups g.

When the remaining silver image $Ag_{image}$ (Xg, yg) has been determined, IR' (xi, yi), which is corrected IR data, is determined by subtracting the remaining silver image $Ag_{image}$ (Xg, yg) of a corresponding pixel group g from IR $(X_j, y_j)$ of each pixel. That is, the IR image is corrected using a proper IR density when no dustlflaw exists.

$$IR'(x_i, y_i) = IR(x_i, y_i) - Ag_{Image}(X_g, y_g)$$

Next, a pixel having a dust/flaw is detected using IR' $(x_i, y_i)$ which is the corrected IR data. A detecting method is not particularly limited, and a method of detecting a pixel whose IR' $(x_i, y_i)$ exceeds a predetermined threshold value as a pixel having a dust/flaw, for example, is exemplified.

When the pixel having the dust/flaw has been detected, the visible image is corrected, that is, the R, G, and B visible image data is corrected using the address information of the pixel having the dust/flaw and arranged as an image having no dust/flaw. Note that, a method of correcting the visible image (dust/flaw) is not particularly limited, and various known methods, for example, a method of using interpolation, a method making use of the continuity of pixel, and the like can be used.

The visible image data whose dust/flaw has been corrected is sent to the next image correcting subsection 54.

In the above example, the dust/flaw is detected by the predetermined threshold value by correcting the measured IR data (IR density). However, the present invention is not limited thereto, and the dust/flaw may be detected by, for example, changing the threshold value according to the calculated remaining silver image $Ag_{Image}$ and using the changed threshold value and the IR data, in place of correcting the IR data.

In the illustrated example, the dust/flaw is processed using the RGB image densities with emphasis on the influence of the remaining silver. However, the dust/flaw may be detected in the same way by determining the correlation between the visible image data and the IR data and determining the remaining silver image $Ag_{Image}$ using visible image data of only one color (for example, R image data), in addition to the illustrated example.

Further, the dust/flaw is detected by reading the IR image (invisible image) as a reference image in the above example. However, the present invention is not limited thereto, and the dust/flaw may be detected from the correlative distribution of pixels between the visible images and the reference image by reading the reference image in a color corresponding to any one color of the R, G, and B visible images and in a wavelength different from that used to read the visible images.

Figure 6A:
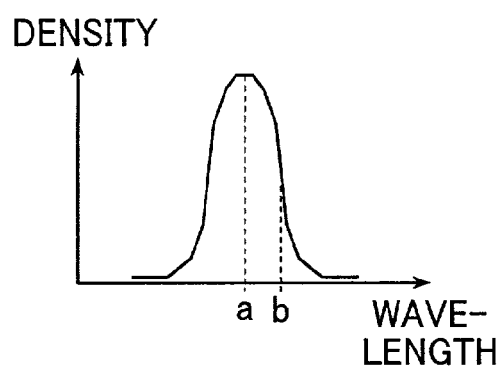
FIGS. 6(A), (B), (C), and (D) are graphs explaining another example of image defect detection of in the present invention.

FIG. 6(A) shows an example of the color development characteristics of a certain one color (dye) of the film F.

Figure 6B:
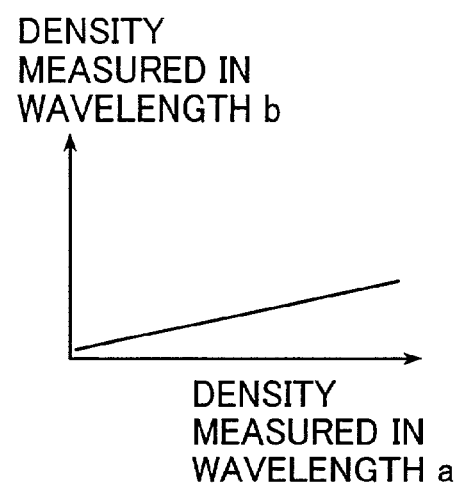

It is assumed that an image is read in the color shown in FIG. 6(A) as well as in a wavelength a corresponding to the peak of color development and in a wavelength b on a longer wavelength side having a color development density lower that of the wavelength a. At this time, the densities measured in both the wavelengths are represented by a straight line having an inclination of 1 or less when the wavelength a in which the color development is maximized is shown by a horizontal axis, as shown in FIG. 6(B).

Figure 6C:
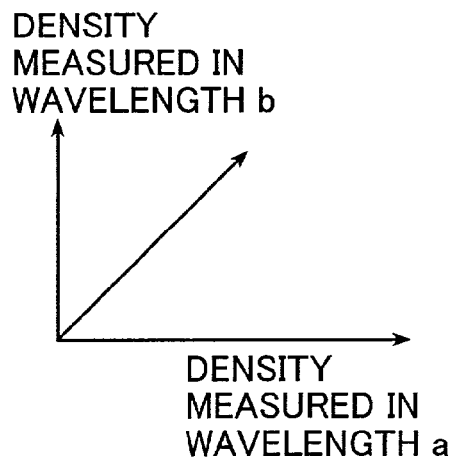
Figure 6D:
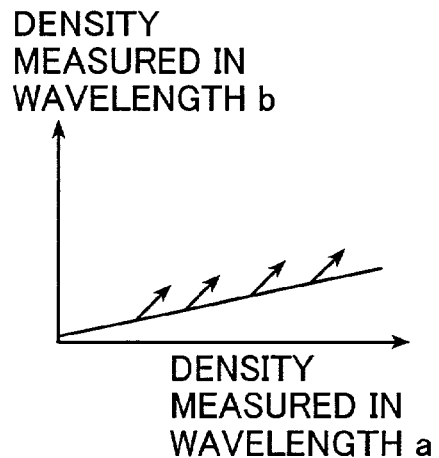

Here, a decrease in the amount of light passing through the film F, that is, the fluctuation of the density of an image read by scanner 12 that is caused by the dust/flaw has no relation to dye and is not influenced by the reading wavelength. Thus, it is the same in the wavelengths a and b. Accordingly, the relationship between the density of an pixel having a dust/flaw measured in the wavelength a and that measured in the wavelength b is represented by a component in a direction having an inclination of 1, as shown in FIG. 6(C).

As a result, when the proper relationship of the densities measured in the same one color, that is, the same one dye and in a plurality of different wavelengths is smaller than the inclination of 1, the density of the pixel having the dust/flaw measured on the low color development density side (wavelength b) is made higher than the proper relationship between both the measured densities, whereby the pixel can be separated.

This method detects the dust/flaw from the correlative distribution of pixels between the visible image density and the reference image density making use of the above result.

As described above, almost all the region of one image is composed of pixels having no dust/flaw. Further, if pixels have no dust/flaw, two images, which are read in the same one color, that is, the same one dye and in a diffident wavelength, correspond to the relationship between the color development characteristics and the difference between the reading wavelengths.

Accordingly, the proper correlation between the visible image density and the reference image density in the images can be found as shown in FIG. 6(B) by, for example, reading the visible images at the peak of color development, reading the reference image in a different wavelength in relation to the same one color, that is, the same one dye, and determining the correlation between the visible image density and the reference image density of each pixel. Thereafter, a pixel outside of this correlation is detected as a dust/flaw because a pixel having an image defect caused by the dust/flaw is outside of this correlation and the density of the reference image is usually higher than the correlation. That is, it can be contemplated that the aforementioned IR image reading method is an extreme example of this method.

A pixel of the visible image and a pixel of the reference image are influenced by remaining silver similarly if they are the same pixel. Accordingly, it is possible to detect the image defect caused by the dust/flaw with pinpoint accuracy without erroneous detection caused by remaining silver also in this method.

Further, the dust/flaw can be detected using visible light without the need of using light having a long wavelength such as IR light. As known well, it is very difficult to design an optical system treating both visible light and IR light due to aberration on an optical axis, and the like. According to this method, however, the above problem can be solved, and an optical system can be designed similarly to that using only visible light.

Further, since some films (for example, KODACHROME of Eastman Kodak, and the like) absorb an invisible image of IR and the like, they cannot employ the conventional image defect detecting method. However, according to this method of using visible light, they can detect it without any problem.

That is, according to this method, various effects can be obtained such as an increase in the range of selection of an optical system, for example, a reference image reading light source (filter), and the like, easy design of optical system, elimination of improper detection due to a type of film, and the like, in addition to an effect of making it possible to detect an image defect with pinpoint accuracy eliminating erroneous detection caused by remaining silver.

The dust/flaw may be detected in any color of R, G, and B.

While it is sufficient here that the reference image be read in the same one color, that is, the same one dye as that when the visible image is read and in a different wavelength, there is an tendency that a large difference between color development densities when the visible image is read and when the reference image is read makes it possible to detect an image defect easier and more accurately. In contrast, if the wavelength in which the reference image is read is in a region where other color is developed, it is difficult to detect the image defect inversely even if there is a large difference between the color development densities of the visible image and the reference image when they are read. Accordingly, the wavelength used to read the reference image must be appropriately determined in consideration of the above mentioned.

As described above, the R, G, and B visible image data whose image defect has been corrected in the dust/flaw correcting subsection 50 is then processed in the image correcting subsection 54.

The image correcting subsection 54 is a section where various image processing that is executed in the digital print system is carried out such as image enlargement/reduction processing (electronic magnification processing), sharpness (sharpness emphasis) processing, density correction, color correction (saturation correction), dodging processing (expansion/contraction processing of the dynamic range of image densities), gradation conversion, and so on.

The visible image data having been subjected to the various image processing in the image correcting subsection 54 is supplied to the data converting subsection 58.

The data converting subsection 58 converts the visible image data into image data corresponding to a print, which is output from the printer 22, using, for example, a three-dimensional (3D) look-up table, or the like.

Note that, in the print system 10, the visible image data having been processed in the image correcting subsection 54 may be converted into an image file of various image formats, for example, a JPEG format and supplied to a recording medium such as a CD-R, an MD (minidisc), and the like. Otherwise, both the print image data and the image file may be output.

The printer 22 is a known color printer that outputs a light-sensitive material (photographic paper) as a print after the light-sensitive material is two-dimensionally scan exposed with, for example, a laser beam, which is modulated according to R (red), G (green), and B (blue) image data supplied so as to record a latent image thereon, and after the thus exposed light-sensitive material is subjected to wet type development processing including development, fixing, and washing so that the latent image is converted to a visible image, and then dried.

While the image reading apparatus of the present invention has been described above in detail, the present invention is by no means limited to the above embodiment, and it goes without saying that various improvements and modifications can be made within the range which does not depart from the gist of the present invention.

In the above example, the image of, for example, the photographic film, which is treated as a subject to be processed, is read and the image defect thereof caused by a dust/flaw is detected. However, the present invention is not limited thereto and can be preferably utilized in a case in which the image of a photographic paper, a reflecting original such as a printed material, and the like is read.

As described above in detail, according to the image reading apparatus of the present invention, when the image, and the like recorded on a film is photoelectrically read thereby, it is possible to detect the dust/flaw of the film with pinpoint accuracy without erroneous detection without depending upon a type of the film and a state of the image, which permits an image of high quality whose dust/flaw has been preferably corrected to be output in excellent productivity. Moreover, according to the present invention, it is possible to increase the types of films to which the present invention can be applied and the range of selection of the optical members such as the light source, the filter, and the like and to easily design an optical system.

What is claimed is:

1. An image reading apparatus for photoelectrically reading an original image, comprising:
    an image reading device having a first reading unit for reading a visible image carried by said original image and a second reading unit for reading a reference image in a wavelength different from that used to read said visible image; and a detection device for acquiring correlative pixel distribution information between a visible image signal and a reference image signal using said visible image and said reference image having been read by said image reading device and detecting an image defect caused by a foreign particle deposited on said original image and a flaw of an original using the information.

2. The image reading apparatus according to claim 1, wherein said detection device detects said image defect using said reference image signal and a threshold value as well as detects said image defect by correcting said reference image signal according to said correlative pixel distribution information or by changing said threshold value according to said correlative pixel distribution information.

3. The image reading apparatus according to claim 2, wherein said detection device determines a proper image reference signal to said visible image signal from said correlative pixel distribution information between said visible image signal and said reference image signal and corrects said reference image signal or changes said threshold value using said proper reference image signal.

4. The image reading apparatus according to claim 1, wherein said second reading unit reads an invisible image as said reference image.

5. The image reading apparatus according to claim 1, wherein said second reading unit reads said reference image in correspondence to one color in said visible image read by said first reading unit as well as in a wavelength different from that used in said first reading unit.

6. The image reading apparatus according to claim 1, wherein said detection device detects said image defect using said reference image signal and a threshold value as well as detects said image defect by correcting said reference image signal according to said correlative pixel distribution information.

7. The image reading apparatus according to claim 1, wherein said detection device detects said image defect using said reference image signal and a threshold value as well as detects said image defect by changing said threshold value according to said correlative pixel distribution information.

8. The image reading apparatus according to claim 4, wherein said detection device detects said image defect using said reference image signal and a threshold value as well as determines a minimum reference image signal in a group of pixels each having a same visible image signal as a reference image signal caused by a remaining silver component from said correlative pixel distribution information and detects said image defect by correcting said reference image signal according to said reference image signal caused by remaining silver.

9. The image reading apparatus according to claim 4, wherein said detection device detects said image defect using said reference image signal and a threshold value as well as determines a minimum reference image signal in a group of pixels each having a same visible image signal as a reference image signal caused by a remaining silver component from said correlative pixel distribution information and detects said image defect by changing said threshold value according to said reference image signal caused by remaining silver.

10. The image reading apparatus according to claim 8, wherein said detection device determines a proper reference image signal for said visible image signal from said correlative pixel distribution information between said visible image signal and said reference image signal by subtracting said reference image signal caused by a remaining silver component from said reference image signals of said pixels each having a same visible image signal, and corrects said reference image signal using said proper reference image signal.

11. The image reading apparatus according to claim 9, wherein said detection device determines a proper reference image signal for said visible image signal from said correlative pixel distribution information between said visible image signal and said reference image signal by subtracting said reference image signal caused by a remaining silver component from said reference image signals of said pixels each having a same visible image signal, and changes said threshold value using said proper reference image signal.

12. The image reading apparatus according to claim 1, wherein said second reading unit reads said reference image in correspondence to one color in said visible image read by said first reading unit as well as in a wavelength different from that used in said first reading unit; and said detection device detects said image defect by detecting a pixel outside of a correlation between said visible image signal and said reference image signal corresponding to a relationship between color development characteristics of said original image and a reading-wavelength-difference from said correlative pixel distribution information.

* * * * *